United States Patent
Higuchi et al.

(10) Patent No.: US 8,744,455 B2
(45) Date of Patent: Jun. 3, 2014

(54) WIRELESS COMMUNICATION SYSTEM

(75) Inventors: Mamoru Higuchi, Kawasaki (JP);
Junichi Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 12/558,676

(22) Filed: Sep. 14, 2009

(65) Prior Publication Data

US 2010/0069079 A1    Mar. 18, 2010

(30) Foreign Application Priority Data

Sep. 18, 2008  (JP) .................................. 2008-238767

(51) Int. Cl.
*H04W 72/04*      (2009.01)

(52) U.S. Cl.
USPC .......................... 455/450; 455/422.1; 370/328

(58) Field of Classification Search
USPC .......... 455/450–456, 422, 562; 370/328–338, 370/349, 395
See application file for complete search history.

(56) References Cited

U.S. PATENT DOCUMENTS

| | | | |
|---|---|---|---|
| 2003/0162547 A1* | 8/2003 | McNair | 455/450 |
| 2004/0114566 A1* | 6/2004 | Lim et al. | 370/349 |
| 2008/0198798 A1* | 8/2008 | Wu et al. | 370/328 |
| 2009/0036135 A1 | 2/2009 | Matsuo et al. | |
| 2010/0035600 A1* | 2/2010 | Hou et al. | 455/422.1 |

FOREIGN PATENT DOCUMENTS

| | | |
|---|---|---|
| JP | 06-090198 | 3/1994 |
| JP | 6-511128 | 12/1994 |
| JP | 9-247079 | 9/1997 |
| WO | 93/21699 | 10/1993 |
| WO | 2006/104102 | 10/2006 |

* cited by examiner

*Primary Examiner* — Kashif Siddiqui
(74) *Attorney, Agent, or Firm* — Myers Wolin, LLC

(57) ABSTRACT

A wireless communication system includes a first base station and a second base station. The first base station includes a designator for determining a first resources for using the first base station and a second resources for using other base station in the predetermined radio resources, and a first transmitter for transmitting a first data by the use of the first resources to the mobile station and designation information determined on the bases of the second resources. The second base station includes a receiver for receiving the designation information from the first base station, and a second transmitter for transmitting a second data by the use of the second radio resources to the mobile station.

9 Claims, 12 Drawing Sheets

US 8,744,455 B2

WIRELESS COMMUNICATION SYSTEM

CROSS-REFERENCE TO RELATED APPLICATION

This application is based upon and claims the benefit of priority of the prior Japanese Patent Application No. 2008-238767, filed on Sep. 18, 2008, the entire contents of which are incorporated herein by reference.

FIELD

The embodiments discussed herein are related to a wireless communication system.

BACKGROUND

In the wireless communication system, by executing wireless communications between a mobile station and a plurality of base stations disposed with a proper interval therebetween, data transmission and reception to/from the mobile station is performed. As an example of an arrangement of the base station that executes the communication with the mobile station, a hierarchical cell structure system has been well known. In the hierarchical cell structure system, in general, a base station for wide area is arranged for wireless communication in the entire relatively-wide area and one or a plurality of base stations for narrow area are arranged in a wide area for wireless communication in a local area of a part of the wide area.

Japanese Laid-open Patent Publication No. 09-247079, Japanese Laid-open Patent Publication No. 06-511128, and Japanese Laid-open Patent Publication No. 06-90198 are known as backgrounds.

With the hierarchical cell structure system as mentioned above, the wide-area base station and the narrow-area base station perform the wireless communication by using different frequency bands, respectively. Specifically, in the case where each of the wide-area base station and the narrow-area base station simultaneously transmits data to the mobile station, the wide-area base station and the narrow-area base station perform the wireless communication by using the different frequency bands in order to avoid an interference. However, since the wide-area base station and the narrow-area base station use the different frequency bands, it may necessary to independently secure a frequency band for the wireless communication used by the wide-area base station and a frequency band for the wireless communication used by the narrow-area base station. This is not effective from a viewpoint of effective use of the frequency band.

The above-mentioned technological problem may occur not only in the hierarchical cell structure system but also in the arrangement a plurality of base stations with a part of areas for the wireless communication overlapped. In the case where a plurality of base stations simultaneously respectively transmit data to the mobile station, a plurality of base stations individually need to use different frequency bands. Therefore, the effective use of the frequency band may be prevented similar to the hierarchical cell structure system.

SUMMARY

According to an aspect of the invention, a wireless communication system for communicating with a mobile station and a plurality of base stations, the Wireless communication system includes: a first base station having a first predetermined radio resources capable of transmitting data, the first base station including: a designator for determining a first resources for using the first base station and a second resources for using other base station in the first predetermined radio resources, and a first transmitter for transmitting a first data to the mobile station by the use of the first resources and designation information determined on the bases of the second resources; and a second base station having a second predetermined radio resources for transmitting data, the second predetermined radio resources including the second resources of the first base station, the second base station including: a receiver for receiving the designation information from the first base station, and a second transmitter for transmitting a second data to the mobile station by the use of the second radio resources.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinbelow, embodiments will be described with reference to diagrams.

(1) First Embodiment

First, the first embodiment for realizing a wireless communication system will be described with reference to FIG. 1.

Figure 1:
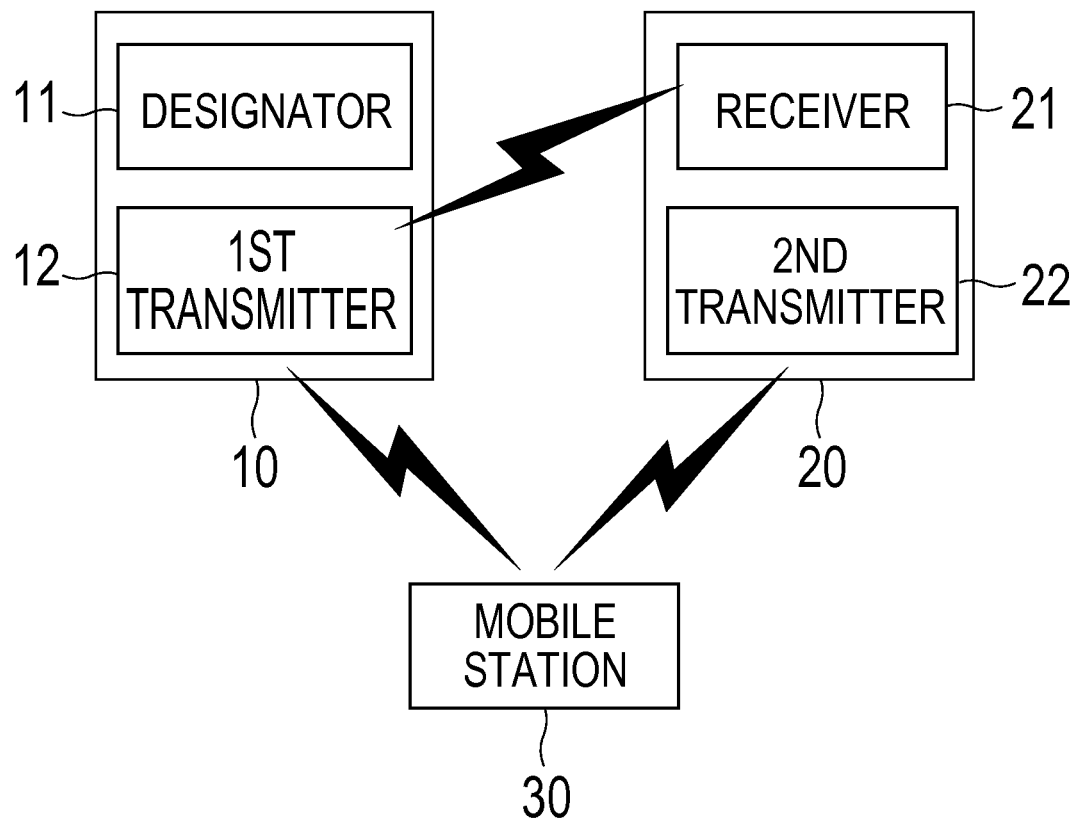
FIG. 1 is a structure diagram illustrating a first embodiment of a wireless communication system.

Here, FIG. 1 is a block diagram illustrating a structure of the wireless communication system according to the first embodiment.

As illustrated in FIG. 1, the wireless communication system according to the first embodiment has a first wireless base station 10 and a second wireless base station 20.

The first wireless base station 10 provides a designator 11 and a first transmitter 12. The designator 11 determines a second resource portion that can be used by the second wireless base station 20 among predetermined radio resources (e.g., radio resource specified by a frequency and a symbol of data). Moreover, The designator 11 determines a first resource portion that can be used by the first wireless base station 20. Furthermore, the designator 11 designates the second resource portion for the second wireless base station 20 and the first resource portion for the first wireless base station 20. The first transmitter 12 transmits first data to a mobile station 30 by using a first resource portion other than the second resource portion that is designated by the designator 11 among the predetermined radio resources. That is, the first transmitter 12 transmits the first data without using the second resource portion among the predetermined radio resources. Then, the first transmitter 12 further transmits designation information illustrating the second resource portion (i.e., specifying the second resource portion) in addition to the first data.

On the other hand, the second wireless base station 20 has a receiver 21 and a second transmitter 22. The receiver 21 receives at least designation information that is transmitted from the first wireless base station 10. The second transmitter 22 transmits second data to the mobile station 30 by using the second resource portion indicating by the designation information that is received by the receiver 21 among the predetermined radio resources. That is, the second transmitter 22 transmits the second data by using the second resource portion that the first transmitter 12 does not use for the transmission of the first data among the predetermined radio resources.

As mentioned above, since the first wireless base station 10 transmits the first data without using the second resource portion and the second wireless base station 20 transmits the second data using the second resource portion, the first wireless base station 10 and the second wireless base station 20 can simultaneously transmit the data by the sharing of the same radio resource. Therefore, since the first wireless base station 10 and the second wireless base station 20 simultaneously transmit the data, it is not required to independently provide radio resources. Thus, the radio resource may be efficiently used.

(2) Second Embodiment

Subsequently, a description will be given of the second embodiment of the wireless communication system.

(2-1) Structure According to Second Embodiment

Figure 2:
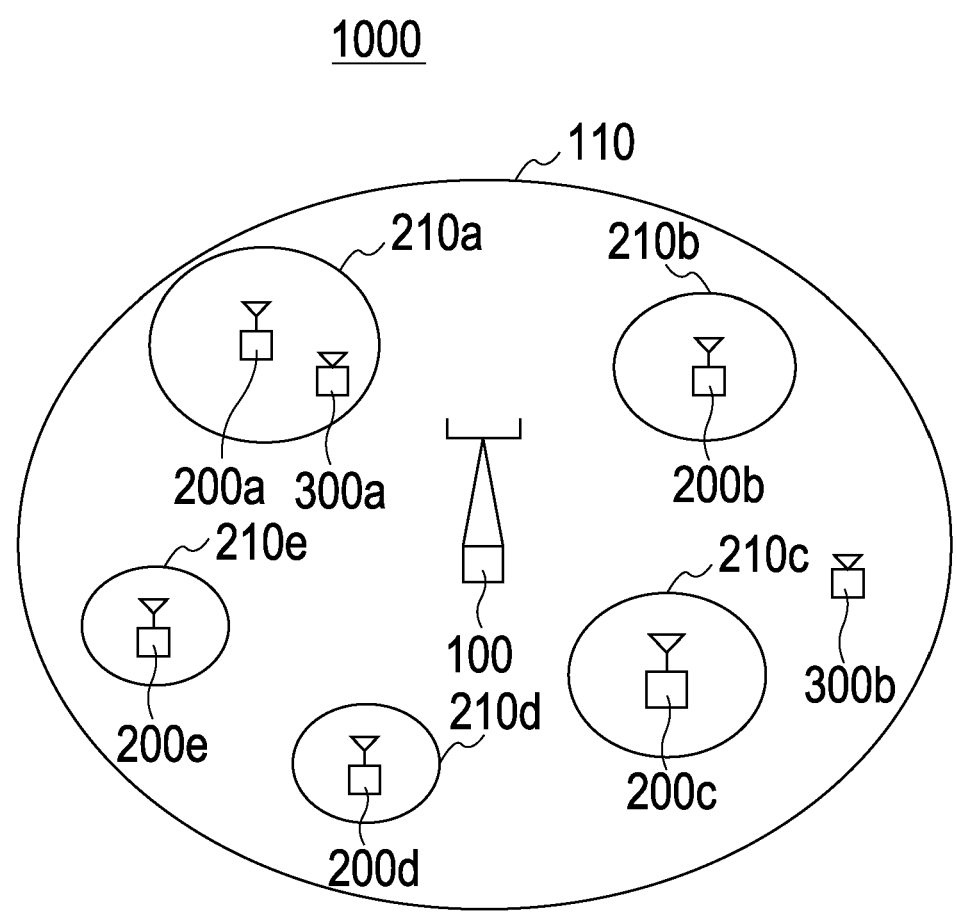
FIG. 2 is a structure diagram illustrating a second embodiment of a wireless communication system.

First of all, a description will be given of a wireless communication system 1000 according to the second embodiment with reference to FIG. 2. FIG. 2 is a diagram of a structure illustrating the wireless communication system 1000 according to the second embodiment.

As illustrated in FIG. 2, the wireless communication system 1000 according to the second embodiment has a wide-area wireless base station 100, a plurality of narrow-area wireless base stations 200 (200*a* to 200*e*), and a plurality of mobile stations 300 (300*a* to 300*b*).

The wide-area wireless base station 100 is a wireless base station that covers an wide area 110 as being relatively wide and structures an example of the "first wireless base station 10" as mentioned above. The wide-area wireless base station 100 executes the wireless communication with both of the narrow-area wireless base station 200 and the mobile station 300 that are located in the wide area 110. More specifically speaking, the wide-area wireless base station 100 transmits a frame including the wide-area information obtained from a host device (not illustrated) for wide area to the narrow-area wireless base station 200 and the mobile station 300 that are located in the wide area 110. The wide-area wireless base station 100 may be structured so as to receive the frame transmitted from the narrow-area wireless base station 200 and the mobile station 300 that are located in the wide area 110.

Each of a plurality of narrow-area wireless base stations 200 is a wireless base station that covers a local (i.e., narrower than the wide area 110) narrow area 210 included in the wide area 100 and structures an example of the "second wireless base station 20" as mentioned above. That is, the wireless communication system 1000 according to the second embodiment adopts the hierarchical cell structure. The narrow-area wireless base station 200 executes the wireless communication with the wide-area wireless base station 100 and the mobile station 300 located in the corresponding narrow area 210. More specifically speaking, the narrow-area wireless base station 200 receives a frame transmitted from the wide-area wireless base station 100. In addition, the narrow-area wireless base station 200 transmits a frame including the narrow-area information obtained from a host device (not illustrated) for narrow area to the mobile station 300 located in the corresponding narrow area 210. The narrow-area wireless base station 200 may be constructed to transmit the frame to the wide-area wireless base station 100 and to receive the frame transmitted from the mobile station 300 located in the corresponding narrow area 210. The correspondence of the narrow-area wireless base station 200 and the narrow area 210 is illustrated by using reference numerals "a" to "e" in FIG. 2. That is, a narrow area 210*a* corresponds to a narrow-area wireless base station 200*a*. Narrow areas 210*b* to 210*e* also correspond to other narrow-area wireless base stations 200*b* to 200*e*, respectively.

Each of a plurality of mobile stations 300 executes the wireless communication with the wide-area wireless base station 100 corresponding to the wide area 110 including the position thereof. Each of the plurality of mobile stations 300 executes the wireless communication with the narrow-area wireless base station 200 corresponding to the narrow area 210 including the position thereof. Specifically, the mobile station 300 receives the frame including the wide-area information transmitted from the wide-area wireless base station 100 and the frame including the narrow-area information transmitted from the narrow-area wireless base station 200. The mobile station 300 may be structured to transmit the frame to the wide-area wireless base station 100 and the narrow-area wireless base station 200, respectively.

Further, in the wireless communication system 1000 according to the second embodiment, for example, by transmitting and receiving a frame of a communication system conformed to Broadband Wireless Access (BWA) as an 802.16 or Worldwide Interoperability for Microwave Access (WiMAX), the wireless communication is executed between the wide-area wireless base station 100 and the narrow-area wireless base station 200, between the wide-area wireless base station 100 and the mobile station 300, and between the narrow-area wireless base station 200 and the mobile station 300, respectively. Therefore, in the wireless communication system 1000 according to the second embodiment, the wireless communication is made by transmitting and receiving a frame in a predetermined format based on an OFDM (Orthogonal Frequency Division Multiplexing) system using a plurality of sub-carriers or based on an OFDMA (Orthogonal Frequency Division Multiple Access) system using a sub-channel structured by combining a symbol and a logical channel obtained by dividing the sub-careers and on the axis of frequency.

Figure 3:
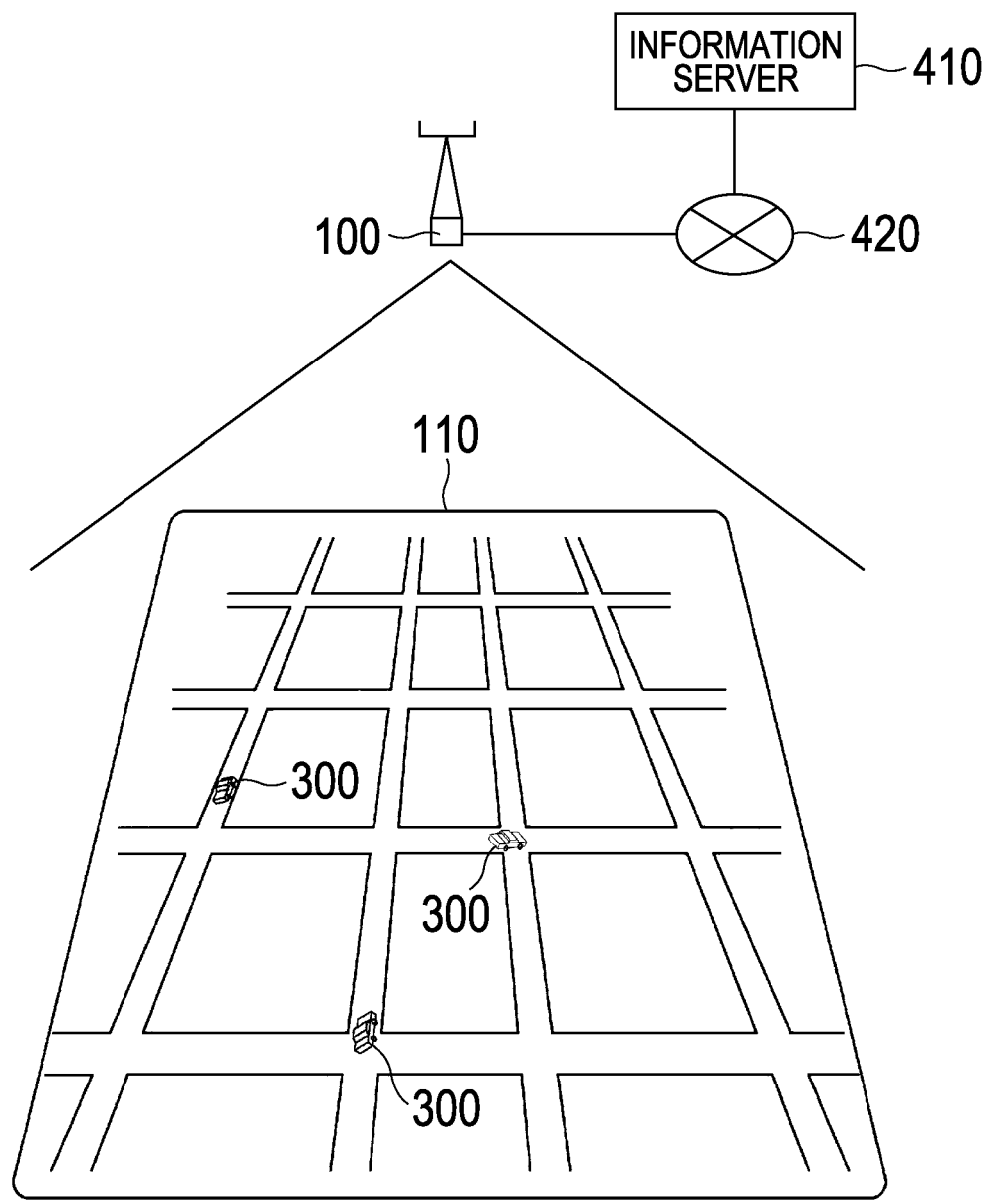
FIG. 3 is a structure diagram illustrating an applying example to a traffic safety system of a wide-area wireless base station provided for the wireless communication system according to the second embodiment.
Figure 4:
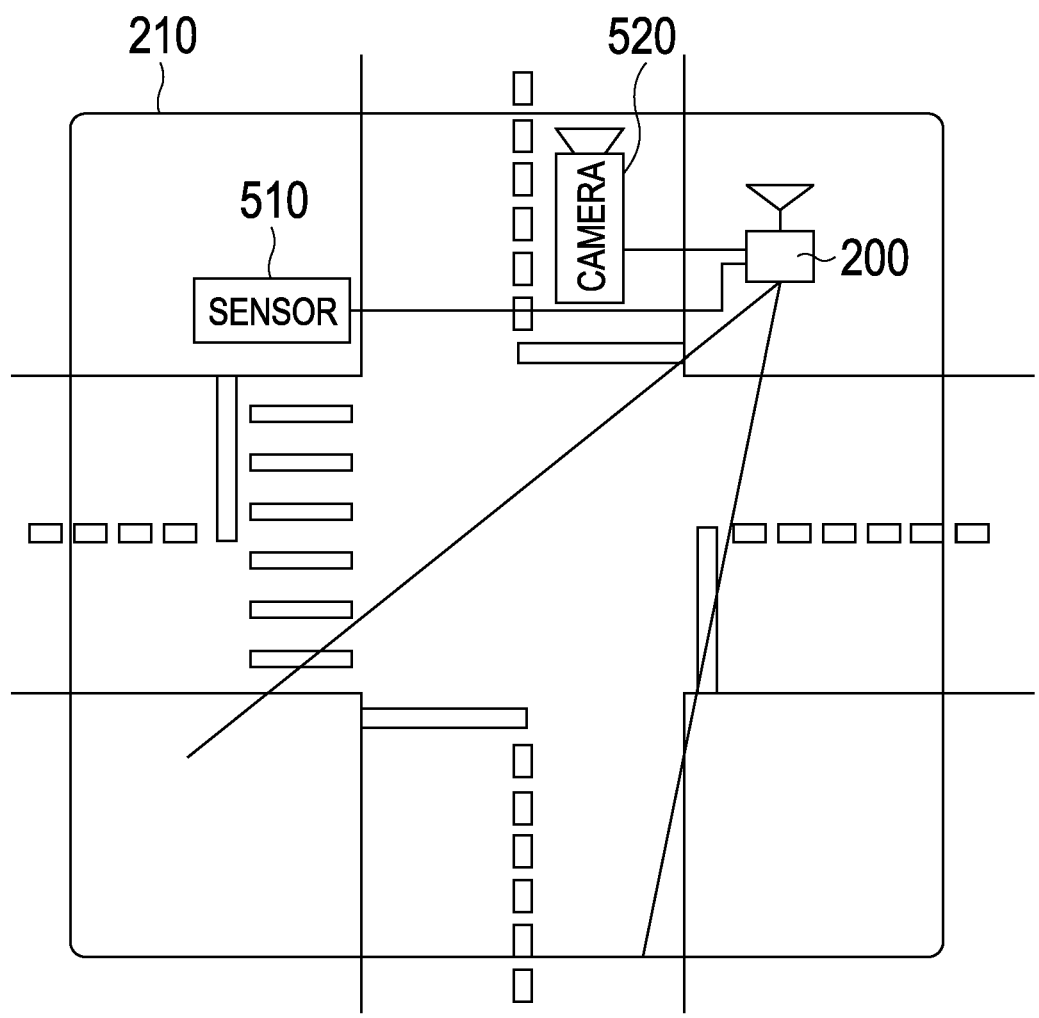
FIG. 4 is a structure diagram illustrating an applying example to a traffic safety system of a wireless base station for narrow area provided for the wireless communication system according to the second embodiment.

The wireless communication system 1000 as mentioned above is applied to, e.g., a traffic safety system for delivering traffic information to the mobile station 300 equipped with a vehicle. Herein, a description will be given of an example of applying the wireless communication system 1000 according to the second embodiment to the traffic safety system with reference to FIGS. 3 and 4. FIG. 3 is a structure diagram illustrating an application example of the traffic safety system for the wide-area wireless base station 100 equipped with the wireless communication system 1000. FIG. 4 is a structure diagram illustrating an application example of the traffic safety system for the narrow-area wireless base station 200 equipped with the wireless communication system 1000.

As illustrated in FIG. 3, for example, the wide-area wireless base station 100 distributes wide-area information including traffic information commonly available to vehicles traveling in the wide area 110 to the wide area 110 ranging from several to tens of kilometers square. The wide-area information may include examples of: information on a traffic jam illustrating a traffic road jam situation in the wide area 110; weather report information in the wide area 110; information on a traffic regulation illustrating a road regulation situation in the wide area 100; information on a required time illustrating the time required to run on a road in the wide area 110; parking-lot information illustrating a situation of free space of a parking lot locating in the wide area 110; and spot information illustrating information regarding to a spot such as shops (e.g., a spot in accordance with what a user likes).

The above-mentioned wide-area information is transmitted to the wide-area wireless base station 100 via a wired or radio network 420 from a host device for wide area such as an information server 410 provided for the Road Information Center, the National Police Agency, and the Japan Meteorological Agency. The wide-area wireless base station 100 transmits the wide-area information to the mobile station 300 in the wide area 110 (e.g., the mobile station 300 provided for a vehicle or attached by a driver of the vehicle).

Subsequently, as illustrated in FIG. 4, the narrow-area wireless base station 200 is disposed near an arbitrary intersection in the wide area 110. The narrow-area wireless base station 200 distributes, to the narrow area 210 including one intersection, narrow-area information including traffic information commonly available to vehicles traveling in the narrow area 210. The narrow-area information includes an example of traffic information contributing to realize the driving safety of the vehicle proceeding to the intersection. Specifically, the narrow-area information can includes of examples: information for sending a notification indicating whether or not an oncoming vehicle exists to a vehicle turning right at the intersection; information for sending a notification indicating whether or not a pedestrian exists to a vehicle turning right or left across a crossing; information for previously sending a notification indicating whether a traffic light disposed at the intersection changes to yellow or red from blue; and information for sending notification indicating that an emergency vehicle comes closer to the intersection. The narrow-area wireless base station 200 may distribute not only the traffic information but also the spot information regarding the spot of a shop located near the intersection and various other useful information that is respect to a position near the intersection as the narrow-area information.

The narrow-area wireless base station 200 may be located not only near the intersection but also at an arbitrary position for transmitting useful information to the running vehicle. For example, the narrow-area wireless base station 200 may be located just before a gate of a high interchange. In this case, the narrow-area wireless base station 200 may transmit, as the narrow-area information, the road situation of the highway (e.g., congestion information, information illustrating time required to travel in the area, and regulation information) to the narrow area 210 including the front of the gate of the highway interchange.

The narrow-area information is created on the basis of: an image shot by a camera 520 disposed at the intersection; information obtained by a sensor 510 for pedestrian disposed near the crossing; and information obtained by a controller that controls the traffic light. The narrow-area information may be created by transmitting information obtained from a narrow-area host device such as the pedestrian sensor 510 or camera 520 to the narrow-area wireless base station 200 and analyzing the transmitted information by the narrow-area wireless base station 200. Alternatively, the narrow-area information may be also created by analyzing the information obtained from the pedestrian sensor 510 or camera 520 with an analyzer (not illustrated) located together with the pedestrian sensor 510 or camera and by thereafter transmitting the analyzed result to the narrow-area wireless base station 200.

Obviously, the traffic safety system is an example to which the wireless communication system 1000 according to the second embodiment is applied and the wireless communication system 1000 according to the second embodiment may be also applied to various kinds of communication systems except for the traffic safety system. For example, the wireless communication system 1000 according to the second embodiment may be also applied to a mobile communication system using a mobile devise including a mobile phone or a PDA (Personal Digital Assistant).

Although FIG. 2 illustrates an example in which the entire-narrow area 210 is included in the wide area 110, a part of the narrow area 210 may be overlapped to the wide area 110. That is, another part of the narrow area 210 may be not overlapped to the wide area 110. Although FIG. 2 illustrates an example in which a plurality of narrow areas 210 are arranged in the wide area 110, at least one of the narrow areas 210 may be arranged in the wide area 110. Further, although FIG. 2 illustrates an example in which the wireless communication system 1000 has one wide-area wireless base station 100, the wireless communication system 1000 may have a plurality of wide-area wireless base station 100.

(2-2) Structure and Operation of Wide-Area Wireless Base Station

Figure 5:
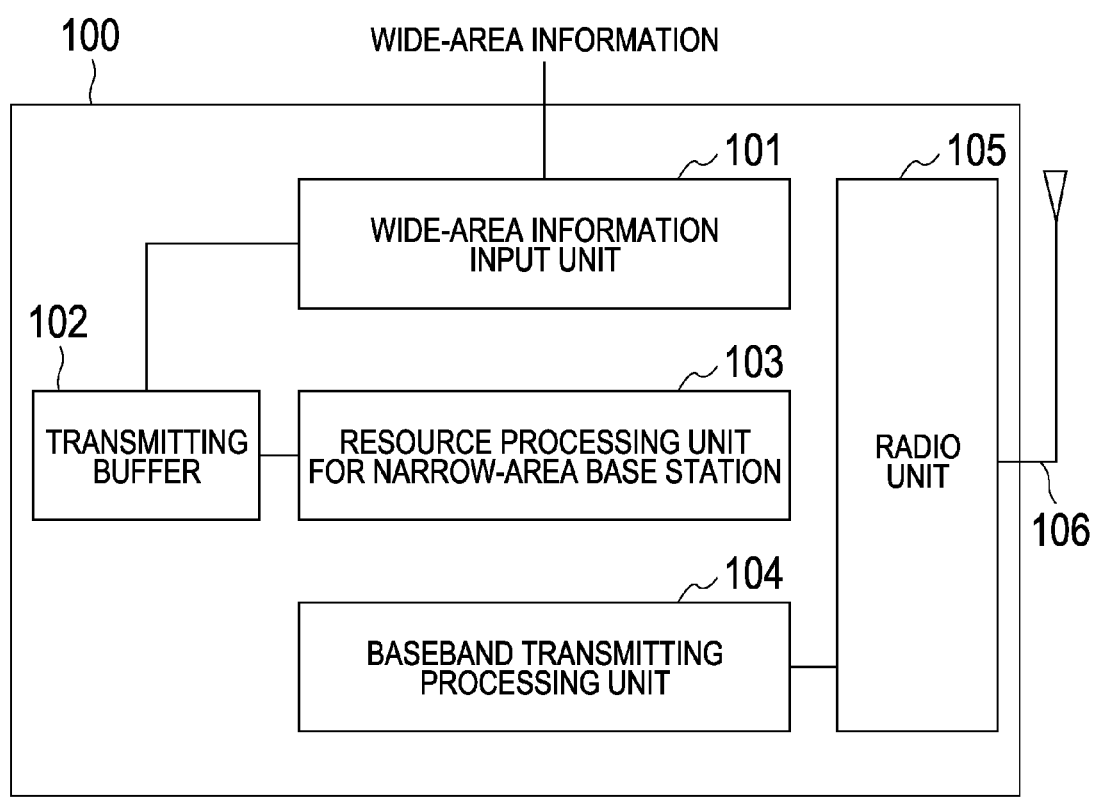
FIG. 5 is a block diagram illustrating the structure of a wide-area wireless base station according to the second embodiment.
Figure 6:
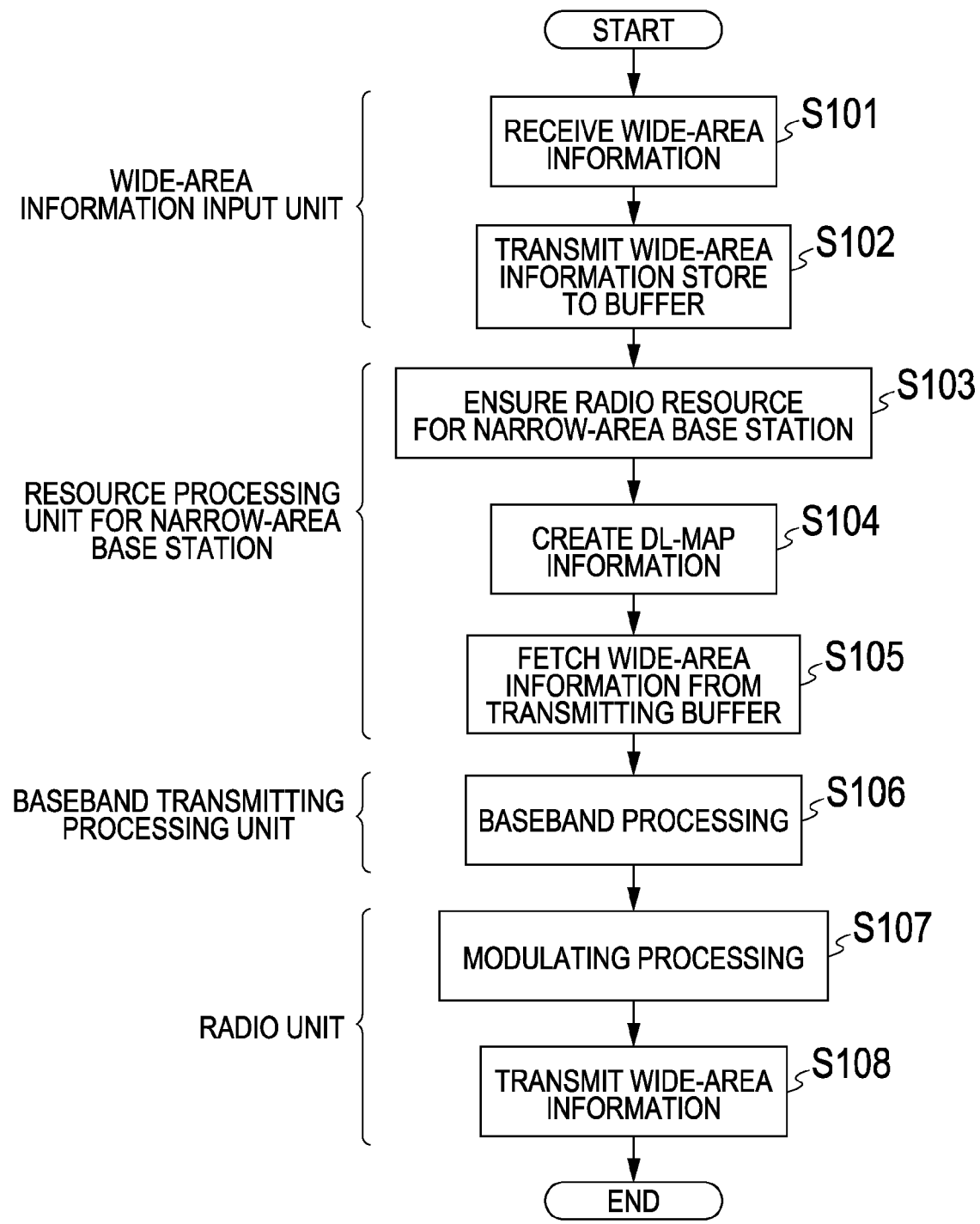
FIG. 6 is a flowchart schematically illustrating a flow of an operation of the wide-area wireless base station according to the second embodiment.
Figure 7:
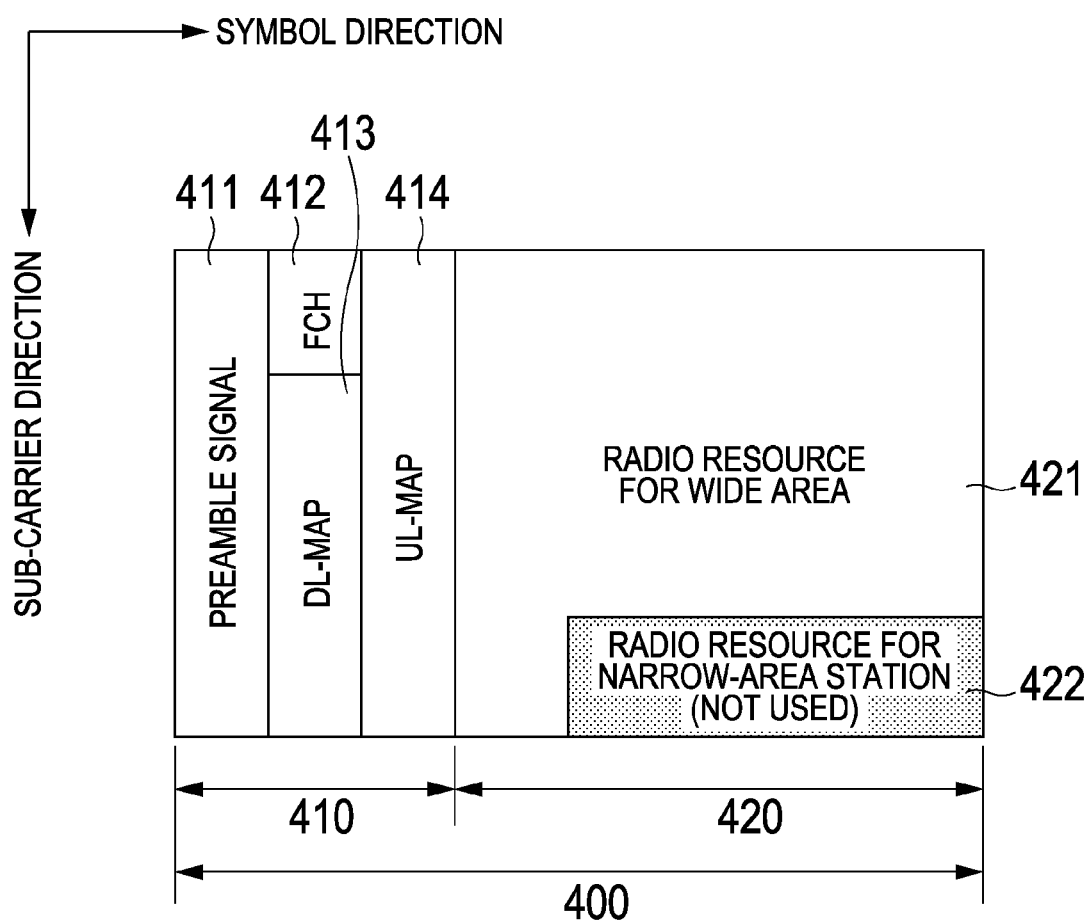
FIG. 7 is a data structure diagram illustrating the structure of a frame transmitted from the wide-area wireless base station according to the second embodiment.

Next, a wide-area wireless base station 100 with reference is illustrates to refer to FIGS. 5 to 7. Herein, FIG. 5 is a block diagram illustrating the structure of the wide-area wireless base station 100, FIG. 6 is a flowchart schematically illustrating an operational flow of the wide-area wireless base station 100, and FIG. 7 is a data structure diagram illustrating a structure of a frame transmitted from the wide-area wireless base station 100.

With attention to a main portion of the wide-area wireless base station 100, as illustrated in FIG. 5, the wide-area wireless base station 100 comprises: a wide-area information input unit 101; a transmitting buffer 102; a narrow-area wireless base station resource processing unit 103; a base-band transmitting processing unit 104; a radio unit 105; and an antenna 106.

The wide-area wireless base station 100 with this structure is operated in accordance with a flowchart illustrated in FIG. 6. Hereinbelow, a description will be given of the operation of the wide-area wireless base station 100 together with the operation and function of various components (i.e., the wide-area information input unit 101, transmitting buffer 102, narrow-area wireless base station resource processing unit 103, base-band transmitting processing unit 104, radio unit 105, and antenna 106) provided for the wide-area wireless base station 100.

As illustrated in FIG. 6, first of all, the wide-area information input unit 101 receives wide-area information transmitted from a host device for wide area (in step S101). Herein, communication between the host device for wide area and the wide-area wireless base station 100 may use not only the WiMAX system but also arbitrary communication systems (e.g., 802.16, internet, etc.). Further, as mentioned above, the communication is not limited to radio one but the wide-area information may be transmitted to the wide-area wireless base station 100 from the host device for wide area with wired communication. Therefore, preferably, the wide-area information input unit 101 has a proper communication processing circuit or information receiving circuit (e.g., an RF circuit, a modulating circuit, decoding circuit, or A/D converting circuit) in accordance with a communication system with the host device for wide area.

Subsequently, the wide-area information input unit 101 outputs the received wide-area information to the transmitting buffer 102. As a result, the wide-area information received by the wide-area information input unit 101 is temporarily stored to the transmitting buffer 102 (in step S102). The transmitting buffer 102 includes a semiconductor memory such as a RAM (Random Access Memory) and various other recording media.

Subsequently to or in parallel with the operation in steps S101 and S102, the narrow-area wireless base station resource processing unit 103 assigns a radio resource for narrow area available to (in other words, to be used by) a narrow-area wireless base station 200 (in step S103).

Herein, FIG. 7 illustrates a processing for assigning the radio resource for narrow area. As mentioned above, the wide-area wireless base station 100 and narrow-area wireless base station 200 transmit and receive a frame with the communication system conforming to the WiMAX system, thereby performing wireless communication with a mobile station 300. Therefore, the frame transmitted from the wide-area wireless base station 100 has a frame structure conforming to the WiMAX system, as illustrated in FIG. 7. As will be described later, the frame transmitted from the narrow-area wireless base station 200 also has the same structure.

Specifically, as illustrated in FIG. 7, a frame 400 is structured on the basis of an OFDM frame (or OFDMA frame) specified by sub-carriers (i.e., a plurality carriers have different frequencies and spreading frequency direction) and symbols (i.e., information codes provide time direction). The frame 400 includes a header portion 410 having control information and a payload portion 420 having the wide-area information (or, narrow-area information).

The header portion 410 has a preamble signal 401, FCH (Frame Control Header) 402, a DL-MAP (Down Link Mapping message) 403, and a UL-MAP (Up Link Mapping message) 404.

The preamble signal 401 is used for establishing the synchronization with the wide-area wireless base station 100 by the mobile station 300 at the initial communication stage or for measuring the quality of the frame 400 transmitted from the wide-area wireless base station 100.

The FCH 402 is notifying information that is transmitted to transmit a modulating system such as the DL-MAP 403 or UL-MAP 404 or a code system so that the mobile station 300 correctly reads the control information such as DL-MAP 403 or UL-MAP 404 to be subsequently connected.

The DL-MAP 403 and UL-MAP 404 is the control information indicating the position of various information (e.g., wide-area information and narrow-area information) included in the payload portion 420. When various information is included in the payload portion 420 on the unit basis of burst, the DL-MAP 403 and UL-MAP 404 include control information (i.e., burst profile information) indicating the burst position.

FIG. 7 illustrates an example of the frame 400 including the payload portion 420 used as a down transmitting sub-frame (i.e., DL burst (Down Link Burst)) for transmitting the wide-area information or narrow-area information to the mobile station 300 from the wide-area wireless base station 100 or narrow-area wireless base station 200. Alternatively, the frame 400 may include a payload portion used as an up transmitting sub-frame (i.e., UL burst (Up Link Burst)) for transmitting various information to the wide-area wireless base station 100 or narrow-area wireless base station 200 from the mobile station 300, as well as the payload portion 420 used as the down transmitting sub-frame.

Herein, the narrow-area wireless base station resource processing unit 103 assigns a part of the radio resources in the payload portion 420, as the radio resource 422 for narrow area available to the narrow-area wireless base station 200. Therefore, another radio resource of the payload portion 420 becomes a radio resource 421 for wide area available to the wide-area wireless base station 100. The radio resource 422 for narrow area is arbitrarily assigned on the unit basis of symbol and sub-carrier (or, sub-channel unit). That is, the narrow-area wireless base station resource processing unit 103 designates the sub-carrier and symbol to be assigned as the radio resource 422 for narrow area, thereby assigning the radio resource 422 for narrow area. The radio resource 422 for narrow area may be assigned every frame or commonly every predetermined number of frames.

Since the wide-area information is already received, the narrow-area wireless base station resource processing unit 103 can relatively easily recognize the amount of data of the wide-area information to be transmitted. Therefore, the narrow-area wireless base station resource processing unit 103 may assign the radio resource 422 for narrow area in accordance with the amount of data of the wide-area information to be transmitted. When the amount of data of the wide-area information to be transmitted is relatively small, the radio resource 421 for wide area may be relatively small and the radio resource 422 for narrow area may be relatively large. Alternatively, when the amount of data of the wide-area information to be transmitted may be relatively large, the radio resource 421 for wide area may be relatively large, and the radio resource 422 for narrow area may be relatively small.

Referring back to FIG. 6, subsequently, in step S104, the narrow-area wireless base station resource processing unit 103 creates the DL-MAP 413 for specifying the radio resource 422 for narrow area assigned by step S103. Therefore, according to the second embodiment, the DL-MAP 413 includes information for specifying the radio resource 422 for narrow area in addition to the information indicating the burst position in the payload portion 420.

In order to include the information for specifying the radio resource 422 for narrow area in the DL-MAP 413, preferably, CID (Connection Identifier) for specific multi-casting is defined as CID dedicated for the radio resource 422 for narrow area, as a wireless communication system 1000. Preferably, the narrow-area wireless base station resource processing unit 103 designates the CID for specific multi-casting in the DL-MAP 413, and creates information (e.g., burst profile information) for creating the position of the radio resource 422 for narrow area in addition to the burst in the payload portion 420.

Subsequently, in step S105, the narrow-area wireless base station resource processing unit 103 extracts the wide-area information that is temporarily stored in the transmitting buffer 102 by step S102. The extracted wide-area information is outputted together with the DL-MAP 413 to the base-band transmitting processing unit 104.

Subsequently, in step S106, the base-band transmitting processing unit 104 performs base-band processing of the wide-area information (further, various information corresponding to the header portion 410) outputted from the narrow-area wireless base station resource processing unit 103. As an example of the base-band processing, the base-band transmitting processing unit 104 performs digital processing including encoding of the wide-area information (e.g., error correction encoding of convolutional code or turbo code) processing or creating processing of OFDM or OFDMA frame (i.e., frame 400).

At this time, the base-band transmitting processing unit 104 performs the base-band processing so as not to use the above-mentioned radio resource 422 for narrow area by the wide-area wireless base station 100. More specifically, as illustrated in FIG. 7, the base-band transmitting processing unit 104 performs the base-band processing so that the information is not included in the radio resource 422 for narrow area and the wide-area information (further, another information) is included in the radio resource 421 for wide area except for the radio resource 422 for narrow area.

As a result of the base-band processing, a digital base-band signal (i.e., frame 400 as a digital signal) is created.

Thereafter, the radio unit 105 performs modulating processing of the base-band signal created by the base-band transmitting processing unit 104 (in step S107). According to the second embodiment, the wireless communication is executed in conformity with the OFDM system (or, OFDMA system). Thus, modulating processing including QPSK (Quadrature Phase Shift Keying), 16 QAM (Quadrature Amplitude Modulation), or 64 QAM is executed every sub-carrier. At this time, a sub-carrier and a symbol corresponding to the radio resource 422 for narrow area are modulated so that amplitude including a pilot signal is 0. Thus, a transmitting signal is included.

Thereafter, the radio unit 105 transmits the transmitting signal to the wide area 110 via the transmitting antenna 106. That is, the radio unit 105 transmits the frame 400 including the wide-area information to the wide area 110 (in step S108).

The frame 400 transmitted from the wide-area wireless base station 100 is received by the mobile station 300 positioned in the wide area 110, and is also received by the narrow-area wireless base station 200 positioned in the wide area 110. As will be specifically mentioned later, the narrow-area wireless base station 200 transmits the frame 400 including the narrow-area information to a narrow area 210 by referring to various information included in the received frame 400.

(2-3) Structure and Operation of Narrow-Area Wireless Base Station

Figure 10:
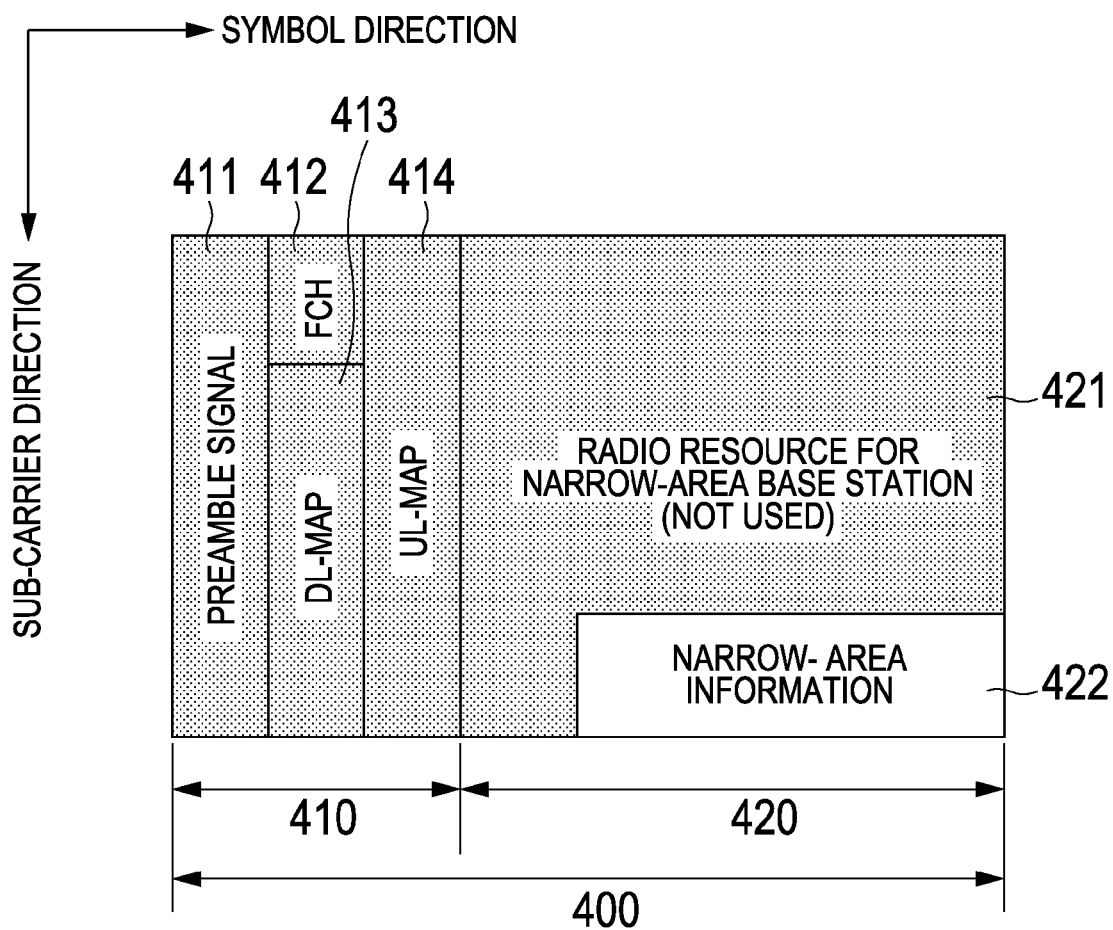
FIG. 10 is a data structure diagram illustrating the structure of a frame transmitted from the wireless base station for narrow area according to the second embodiment.
Figure 11:
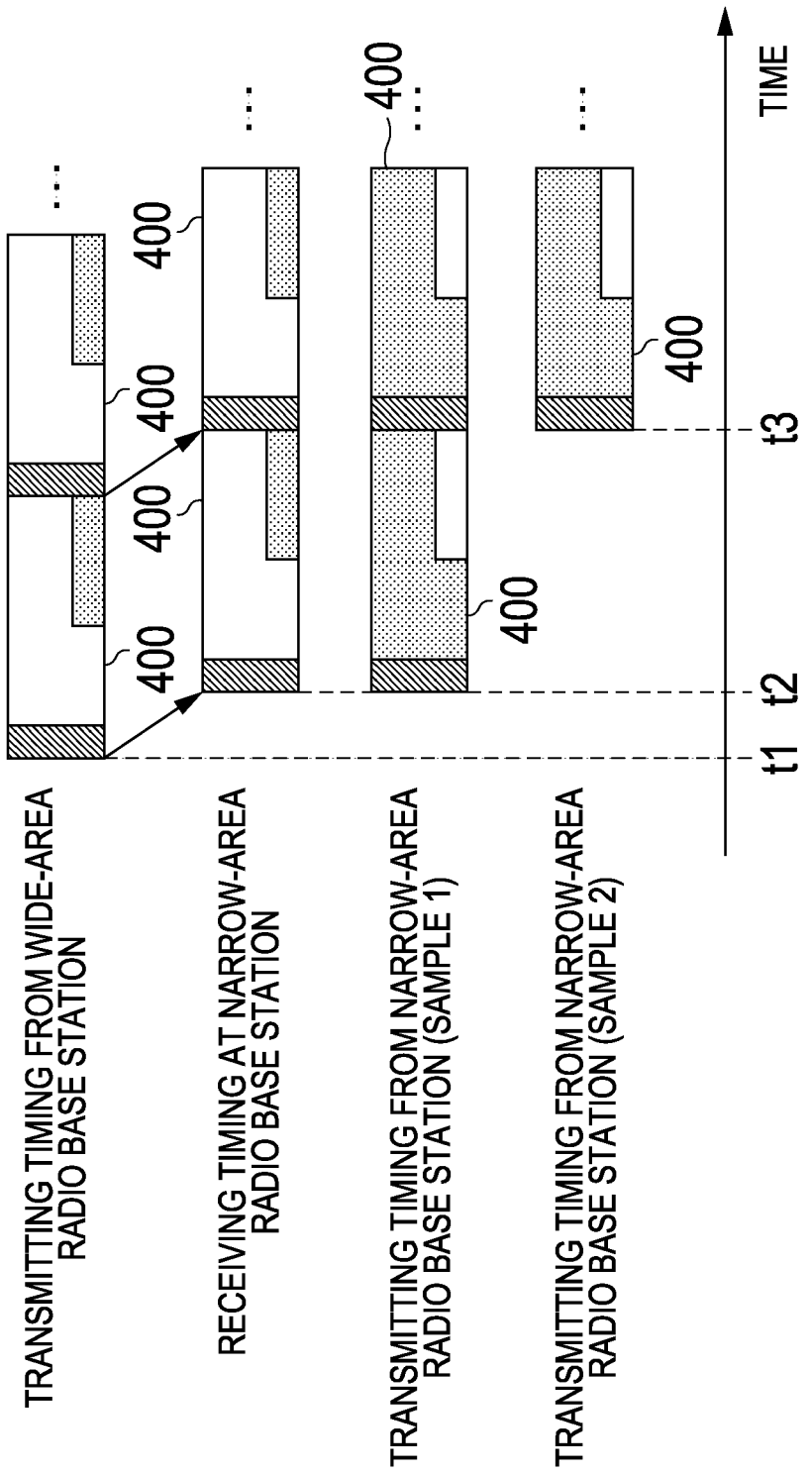
FIG. 11 is a timing chart illustrating a transmitting timing of the frame transmitted from the wireless base station for narrow area according to the second embodiment.

Subsequently, a description will be given of the structure and operation of the narrow-area wireless base station 200 with reference to FIGS. 8 to 11. Herein, FIG. 8 is a block diagram illustrating a structure of the narrow-area wireless base station 200, FIG. 9 is a flowchart schematically illustrating an operational flow of the narrow-area wireless base station 200, FIG. 10 is a data structure diagram illustrating a frame structure transmitted from the narrow-area wireless base station 200, and FIG. 11 is a timing chart illustrating a frame transmitting timing transmitted from the narrow-area wireless base station 200.

Figure 8:
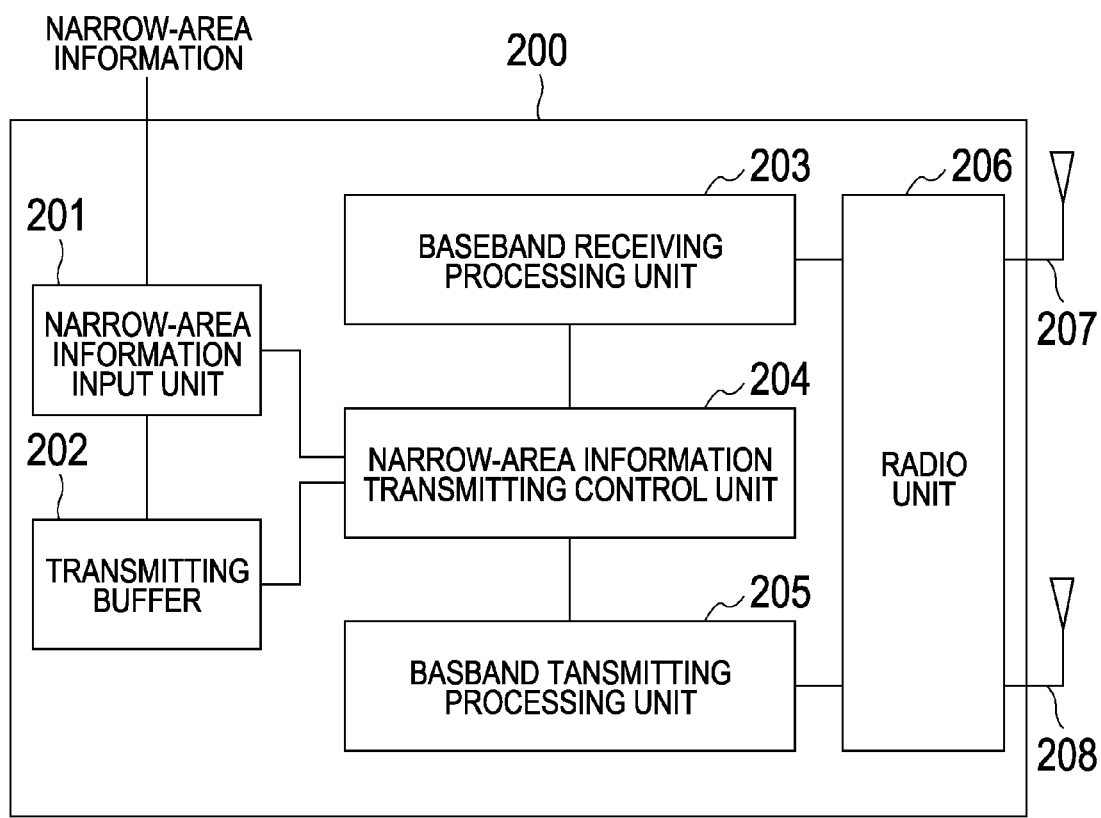
FIG. 8 is a block diagram illustrating the structure of the wireless base station for narrow area according to the second embodiment.

As illustrated in FIG. 8, the narrow-area wireless base station 200 comprises: a narrow-area information input unit 201; a transmitting buffer 202; a base-band receiving processing unit 203; a narrow-area information transmission control unit 204; a base-band transmitting processing unit 205; a radio unit 206; a receiving antenna 207; and a transmitting antenna 208.

Figure 9:
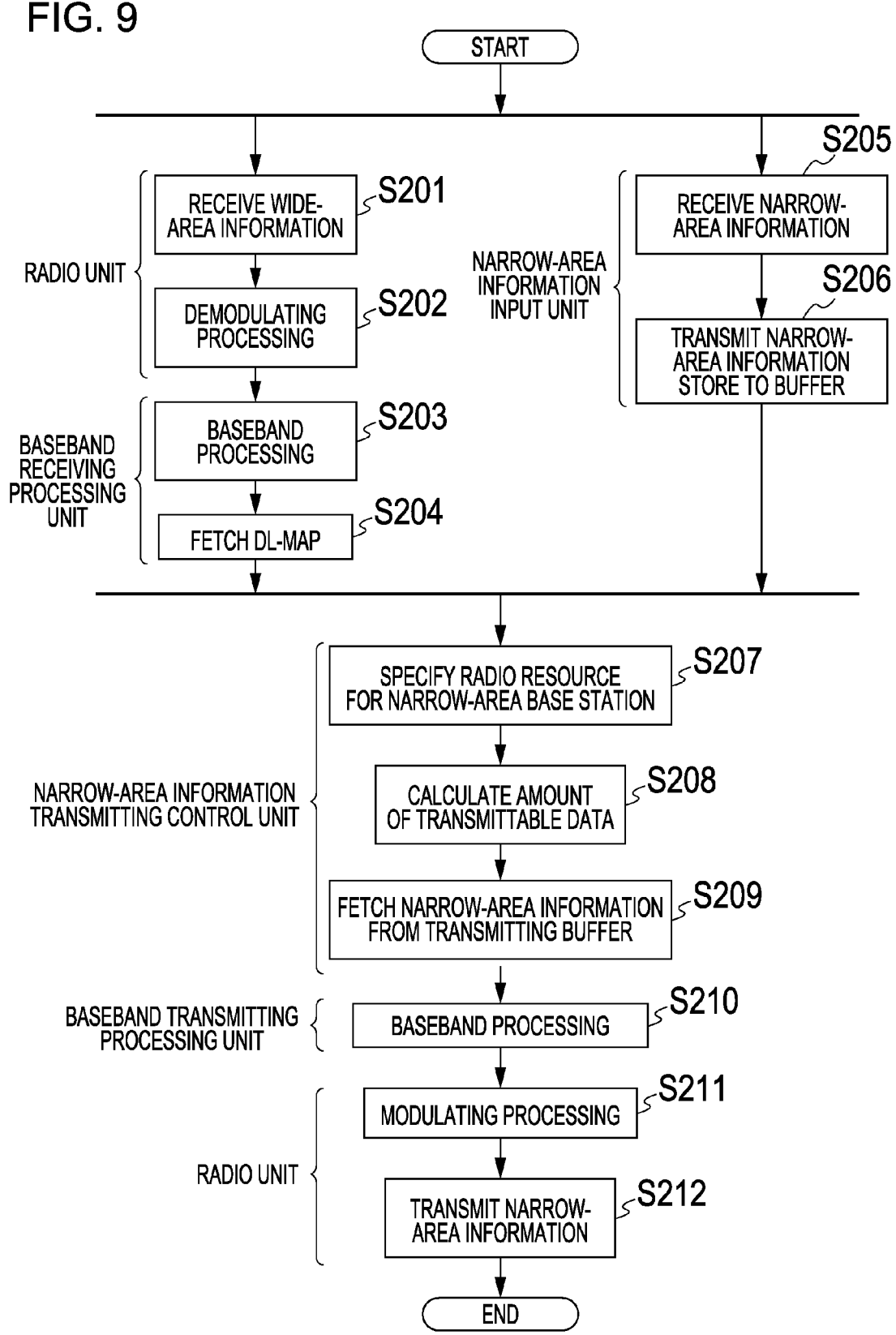
FIG. 9 is a flowchart schematically illustrating an operational flow of the wireless base station according to the second embodiment.

The narrow-area wireless base station 200 with the above-mentioned structure is operated in accordance with the flowchart illustrated in FIG. 9. Hereinafter, a description will be given of the operation of the narrow-area wireless base station 100 while explaining operations and functions of various components provided for the narrow-area wireless base station 200.

As illustrated in FIG. 9, first of all, the radio unit 206 receives a transmitting signal (i.e., frame 400) transmitted from the wide-area wireless base station 100 via the receiving antenna 207 (in step S201). Thereafter, the radio unit 206 performs demodulating processing of the transmitting signal received via the receiving antenna 207 (in step S202). As a consequence, a base-band signal is created. The created base-band signal is outputted to the base-band receiving processing unit 203.

Subsequently, the base-band receiving processing unit 203 performs the base-band processing of the base-band signal (in step S203). As an example of the base-band processing, the base-band receiving processing unit 203 executes decoding processing of the base-band signal. After the base-band processing, the base-band receiving processing unit 203 extracts the DL-MAP 413 included in the frame 400 transmitted from the wide-area wireless base station 100 (in step S204). The extracted DL-MAP 413 is outputted to the narrow-area information transmission control unit 204.

In parallel with the operation in steps S201 to S204, the narrow-area information input unit 201 receives the narrow-area information transmitted from the host device for narrow area (in step S205). Herein, the communication between the host device for narrow area and the narrow-area wireless base station 200 not only use the WiMAX system but also use an arbitrary communication system. Further, as mentioned above, the communication is not limited to the wireless communication, and the narrow-area information may be transmitted from the host device for narrow area to the narrow-area wireless base station 200 with wired communication. Therefore, preferably, the narrow-area information input unit 201 has a proper communication processing circuit or information receiving circuit (e.g., an RF circuit, modulating circuit, decoding circuit, and A/D converting circuit) in accordance with the communication system with the host device for narrow area.

Subsequently, the narrow-area information input unit 201 outputs the received narrow-area information to the transmitting buffer 202. As a consequence, the narrow-area information received by the narrow-area information input unit 201 is temporarily stored to the transmitting buffer 202 (in step S206). As the transmitting buffer 202, there are a semiconductor memory such as a RAM (Random Access Memory) and other recording media.

Subsequently, the narrow-area information transmission control unit 204 specifies the radio resource 422 for narrow area by referring to the DL-MAP 413 outputted from the base-band receiving processing unit 203 (in step S207). Specifically, a resource specified by the sub-carrier and symbol indicated by specific multi-cast CID designated in the DL-MAP 413 is specified as the radio resource 422 for narrow area.

Thereafter, the amount of transmittable data is calculated by using the specified radio resource 422 for narrow area (in step S208).

Subsequently, the narrow-area information transmission control unit 204 extracts the narrow-area information temporarily-stored in the transmitting buffer 202 in step S206 (in step S209). At this time, preferably, the narrow-area information transmission control unit 204 properly extracts the narrow-area information with a proper amount of data from the transmitting buffer 202 so as to transmit the narrow-area information with a proper amount of data corresponding to the amount of transmittable data calculated in step S208. The extracted narrow-area information is outputted to the base-band transmitting processing unit 205.

Subsequently, the base-band transmitting processing unit 205 performs the base-band processing of the narrow-area information outputted from the narrow-area information transmission control unit 204 (in step S210). Although the base-band processing may be the same as the base-band processing executed by the base-band transmitting processing unit 104, another processing may be performed as the base-band processing. However, as illustrated in FIG. 10, the base-band transmitting processing unit 205 performs the base-band processing so that the narrow-area information is included in the radio resource 422 for narrow area and information is not included in the resource (i.e., the radio resource 421 for wide area or header portion 410) except for the radio resource 422 for narrow area.

As a result of the base-band processing, a digital base-band signal (i.e., the frame 400 as a digital signal) is created.

Thereafter, the radio unit 206 performs modulating processing of the base-band signal created by the base-band transmitting processing unit 205 (in step S211). Although the modulating processing may be the same as that performed by the radio unit 105, another modulating processing may be performed. However, as illustrated in FIG. 10, the radio unit 206 performs the modulation so that sub-carriers and symbols corresponding to the radio resource 421 for wide area and the header portion 410 have amplitude of 0, including a pilot signal. As a consequence, a transmitting signal is included.

Thereafter, the radio unit 206 transmits the transmitting signal to the narrow area 210 via the transmitting antenna 208. That is, the radio unit 206 transmits the frame 400 including the narrow-area information to the narrow area 210 (in step S212). At this time, preferably, the radio unit 206 can receive the frame 400 in the corresponding narrow area 210, and adjusts a transmitting output so that the frame 400 cannot be received in another adjacent narrow area 210. As mentioned above, the mobile station 300 positioned in the narrow area 210 receives the frame 400 transmitted from the narrow-area wireless base station 200.

At this time, the radio unit 206 may transmit the frame 400 synchronously with the timing for receiving the frame 400 transmitted from the wide-area wireless base station 100. The operation will be described with reference to FIG. 11.

As illustrated in FIG. 11, the narrow-area wireless base station 200 receives the frame 400 transmitted at a time t1 from the wide-area wireless base station 100 at a time t2. In this case, as illustrated in a transmitting timing (Example 1), at the time t2, the radio unit 206 may start transmission of the frame 400. Alternatively, in consideration of a time required for the extracting processing of the DL-MAP 413 after receiving the frame 400 transmitted from the wide-area wireless base station 100, as illustrated by a transmitting timing (Example 2), at a time t3 after passage of a time corresponding to one frame (or, n (where n is an integer not-less than 2)) from the time t2, the frame 400 may start to be transmitted. That is, the frame 400 may be transmitted so that the frame 400 received by the narrow-area wireless base station 200 is synchronized with the frame 400 transmitted from the narrow-area wireless base station 200 at least on the unit basis of frame (e.g., to match the preamble signals 411 each other on the time base).

As mentioned above, with the wireless communication system 1000 according to the second embodiment, the wide-area wireless base station 100 assigns the radio resource 422 for narrow area used by the narrow-area wireless base station 200, and transmits the wide-area information without using the assigned radio resource 422 for narrow area. Further, the narrow-area wireless base station 200 transmits the narrow-area information by using the radio resource 422 for narrow area assigned by the wide-area wireless base station 100. Therefore, the wide-area wireless base station 100 and the narrow-area wireless base station 200 can simultaneously transmit the wide-area information and the narrow-area information by using the same frequency band (more specifically, the same sub-carrier), respectively. That is, the wide-area wireless base station 100 and the narrow-area wireless base station 200 may simultaneously perform the wireless communication by using individual radio resources within the frequency band (i.e., radio resources specified by the sub-carrier and symbol as well as by using the same frequency band. Therefore, it may not necessary to independently assure a frequency band used by the wide-area wireless base station 100 and a frequency band used by the narrow-area wireless base station 200. Thus, in the wireless communication system 1000 using a hierarchical cell structure, the frequency band is efficiently used.

Further, the narrow-area wireless base station 200 may adjust a transmitting power so that the frame 400 to be transmitted may hardly received or may not be received in another narrow area 210 different from the narrow area 210 corresponding to the narrow-area wireless base station 200. Therefore, if a plurality of the narrow-area wireless base stations 200 individually transmit the narrow-area information by using the same radio resource 422 for narrow area, interference with another narrow-area wireless base station 200 may not caused. Therefore, a plurality of the narrow-area wireless base stations 200 may transmit the narrow-area information to the individual mobile stations 300 while using the same radio resource 422 for narrow area. That is, a plurality of the radio resource for narrow areas 422 may not be assigned to a plurality of the narrow-area wireless base stations 200. Thus, the frequency band is further efficiently used.

However, the narrow-area wireless base station 200 may adjust a transmitting output so as to enable reception of the frame 400 to be transmitted in another narrow area 210 different from the narrow area 210 corresponding to the narrow-area wireless base station 200. In this case, in view of at least a relationship with the wide-area wireless base station 100, the wireless communication may simultaneously performed by using the same frequency band. The frequency band can be efficiently used yet.

Figure 12:
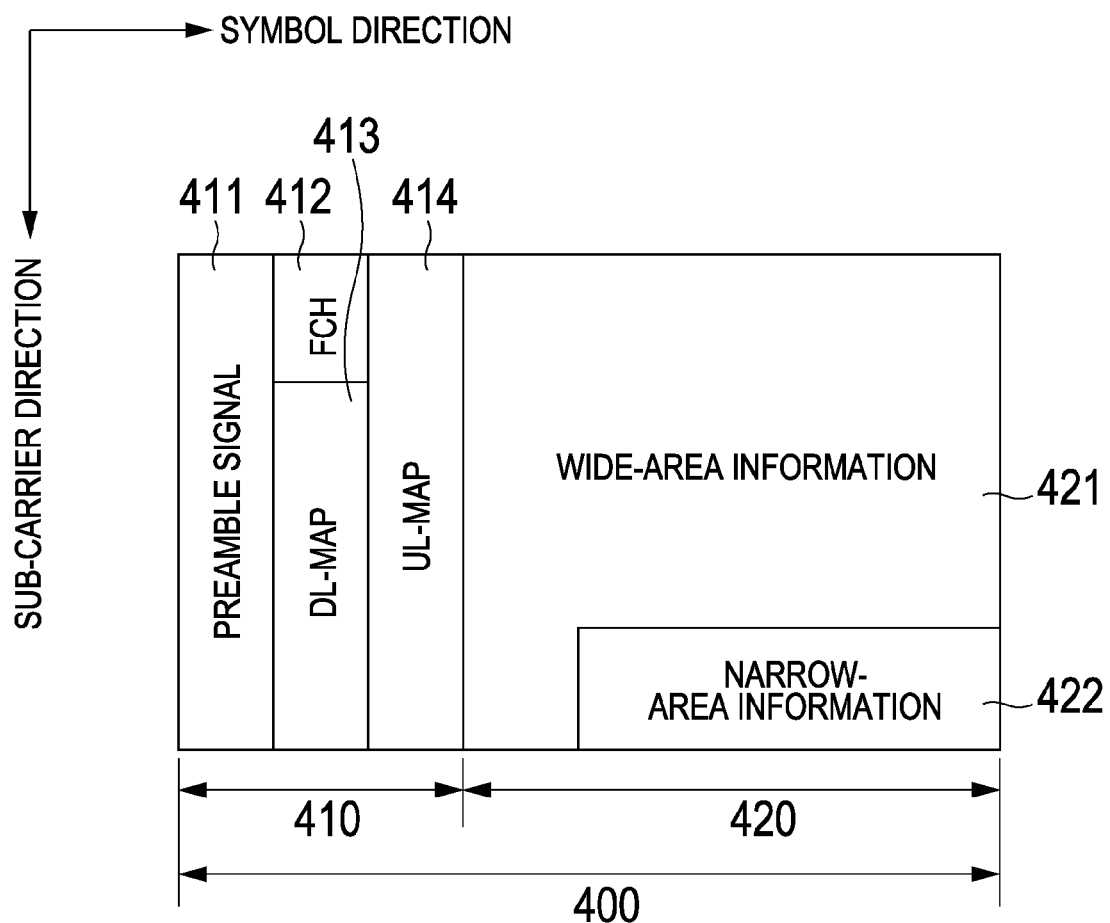
FIG. 12 is a data structure diagram illustrating the structure of a frame received by a mobile station according to the second embodiment.

Further, the narrow-area wireless base station 200 side may transmit the frame 400 synchronously with a timing for receiving the frame 400 to be transmitted from the wide-area wireless base station 100. Therefore, the mobile station 300 may receive the frame 400 to be transmitted from the wide-area wireless base station 100 and the frame 400 to be transmitted from the narrow-area wireless base station 200 in matching state of the individual frames 400 on the unit basis of frame. Therefore, as illustrated in FIG. 12, the mobile station 300 may receive, as the frame 400 transmitted from one wireless base station, the frames 400 to be individually transmitted from the wide-area wireless base station 100 and the narrow-area wireless base station 200. Thus, the mobile station for receiving the information transmitted from one wireless base station may be used as the mobile station 300 in the wireless communication system 1000 without greatly changing the structure or entirely without the change.

The radio resource 422 for narrow area can be arbitrarily assigned on the unit basis of the sub-carrier (i.e., on the unit basis of frequency) and symbol (i.e., the unit basis of time). Therefore, a proper radio resource 422 for narrow area may be assigned case-by-case in accordance with the situation of the wireless communication of the whole wireless communication system 1000. Further, a proper resource 422 for narrow area may be assigned in accordance with the amount of data of the wide-area information to be transmitted by the wide-area wireless base station 100. Therefore, the entire radio resource is effectively used.

A fixed radio resource 422 for narrow area may be assigned without arbitrarily assigning the radio resource 422 for narrow area on the unit basis of sub-carrier and symbol, alternatively, without assigning the resource 422 for narrow area in accordance with the amount of data of the wide-area information to be transmitted by the wide-area wireless base station 100. In this case, the wide-area wireless base station 100 and the narrow-area wireless base station 200 may simultaneously perform the wireless communication with the same frequency band, respectively. Therefore, the frequency band is efficiently used yet.

Further, the assigned radio resource 422 for narrow area is specified by using the DL-MAP 413. Therefore, the wireless communication system 1000 can be realized without greatly changing the structure of frame in conformity with the existing WiMAX system or entirely without the change.

The described above is given of the example of the wireless communication with which the wide-area wireless base station 100 and the narrow-area wireless base station 200 individually use a communication system (communication system using multi-carriers such as OFDM system or OFDMA system) in conformity with the WiMAX system. However, the wireless communication may be performed with another communication system. In this case, the wide-area wireless base station 100 also assigns the radio resource 422 for narrow area and transmits the wide-area information without using the assigned radio resource 422 for narrow area. Further, the narrow-area wireless base station 200 transmits the narrow-area information by using the radio resource 422 for narrow area, thereby effectively using the frequency band.

Further, the present invention is not limited to the example in which the wireless communication is performed with communication system, i.e., multi-carriers communication system) using a plurality of sub-carriers. The wide-area wireless base station 100 and the narrow-area wireless base station 200 may perform the wireless communication by using a communication system (i.e., single-carrier communication system) using a single carrier. Also in this case, the wide-area wireless base station 100 assigns the radio resource 422 for narrow area arbitrarily-assigned on the unit basis of time in the single carrier and transmits the wide-area information without using the assigned radio resource 422 for narrow area, and the narrow-area wireless base station 200 transmits the narrow-area information by using the radio resource 422 for narrow area assigned on the unit basis of time. Thus, the wide-area wireless base station 100 and the narrow-area wireless base station 200 simultaneously transmit the wide-area information and the narrow-area information with a single carrier, respectively. Therefore, the radio resource is efficiently used with a single carrier.

The above description is given of the wireless communication system 1000 using the hierarchical cell structure having wireless base stations as two layers of the wide-area wireless base station 100 and the narrow-area wireless base station 200. However, a wireless communication system may be structured with a multi-layered wireless base station. In addition to the wide-area wireless base station 100 and the narrow-area wireless base station 200, a wireless communication system may be structured with an ultra-wide-area wireless base station for covering an ultra-wide area containing a plurality of the wide areas 110. In this case, one of wireless base stations (more preferably, the highest-hierarchical-structured wireless base station) of a plurality of layered wireless base stations may assign a radio resource available to another wireless base station. Thus, with the wireless communication system using a hierarchical cell structure having wireless base stations with three or more layers, various effects (or, at least a part thereof) provided for the wireless communication system 1000 may be obtained.

Alternatively, the above description is given of the wireless communication system 1000 using the hierarchical cell structure. However, in addition to the wireless communication system 1000 using the hierarchical cell structure, a plurality of wireless base stations whose covering areas are at least partly overlapped may use the same structure as that of the wireless communication system 1000 (particularly, the wide-area wireless base station 100 and the narrow-area wireless base station 200) also in the wireless communication system for simultaneous communication with the mobile station. In this case, various advantages (or, at least one part thereof) obtained by the wireless communication system 1000 are properly obtained.

With the wireless communication system, the communication method, and the wireless base station as described above, since a first wireless base station transmits first data without using a second resource portion and a second wireless base station transmits second data by using a second resource portion, the first wireless base station and the second wireless base station may simultaneously transmit data by using the same radio resource. Therefore, since the first wireless base station and the second wireless base station simultaneously transmit data, it may be not required to independently provide radio resources therefor. Thus, the radio resource can be efficiently used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wireless communication system for communicating with a mobile station and a plurality of base stations, the wireless communication system comprising:

a first base station being assigned with first radio resources for transmitting data, the first base station including:
- a designator for determining first resources from among the first radio resources and second resources other than at least the first resources from among in the first radio resources, wherein the first resources are used by the first base station and the second resources are used by another base station, and
- a first transmitter for transmitting a first data to the mobile station and designation information to a second base station by using the first resources, the designation information determined on the basis of the second resources; and the second base station having second radio resources for transmitting data, the second radio resources including the determined second resources of the first base station, the second base station including:
- a receiver for receiving the designation information from the first base station, and
- a second transmitter for transmitting a second data to the mobile station by the use of the second resources.

2. The wireless communication system of claim 1, wherein each of the first base station and the second base station transmits either the first data or the second data by the use of a multicarrier modulation way including a plurality of subcarriers, and wherein the designator variably designates a number of the subcarriers for using the other base station or time for using the other base station.

3. The wireless communication system of claim 1, wherein the second transmitter transmits the second data by synchronizing with receiving timing of the first data by the receiver.

4. The wireless communication system of claim 1, wherein the second transmitter synchronizes a receiving timing of the receiver receiving the first data with a transmitting timing of the second transmitter transmitting the second data in order to receive a first frame including the first data and a second frame including the second data at the same time in the mobile station.

5. The wireless communication system of claim 1, wherein each of the first base station and the second base station transmits either of the first data or the second data by the use of a frame including a down link map, and wherein the first transmitter put in the designation information in the down link map.

6. The wireless communication system of claim 1, wherein the first base station transmits the first data to a first area, and wherein the second base station transmits the second data to a second area partially overlapping with the first area.

7. The wireless communication system of claim 1, wherein the first base station transmits the first data to a first area, and wherein the second base station transmits the second data to a second area overlapping with the first area.

8. The wireless communication system of claim 1, wherein the first base station transmits the first data to a first area, and wherein the second base station is plural, each of the second base stations having a second area included in the first area of the first base station.

9. A communication method of a wireless communication system for communicating with a mobile station and a first base station and a second base stations, the wireless communication method comprising:
- determining first resources from among first radio resources and second resources other than at least the first resources from among in the first radio resources, the first radio resources being assigned to said first base station for transmitting data, wherein the first resources are used by the first base station and the second resources are used by another base station;
- transmitting a first data to the mobile station and designation information to a second base station by using the first resources, the designation information determined on the basis of the second resources;
- receiving the designation information from the first base station in the second base station, the second base station having second radio resources for transmitting data; and
- transmitting a second data to the mobile station by the second base station by use of the determined second resources of the first base station, wherein the determined second resources are included in the second radio resources of the second base station.

* * * * *